March 3, 1953 W. M. TOMBERLIN ET AL 2,630,525
SYSTEM FOR TRANSMITTING AND RECEIVING
CODED ENTERTAINMENT PROGRAMS
Filed May 25, 1951 3 Sheets-Sheet 1

INVENTORS
WILLIAM M. TOMBERLIN
LOUIS G. MACKENZIE
PAUL K. BENNETT
BY
Attorney

INVENTORS
WILLIAM M. TOMBERLIN
LOUIS G. MACKENZIE
BY PAUL K. BENNETT
[signature]
Attorney

INVENTORS
WILLIAM M. TOMBERLIN
BY LOUIS G. MACKENZIE
PAUL K. BENNETT

Attorney

Patented Mar. 3, 1953 2,630,525

UNITED STATES PATENT OFFICE 2,630,525

SYSTEM FOR TRANSMITTING AND RECEIVING CODED ENTERTAINMENT PROGRAMS

William M. Tomberlin, North Hollywood, Louis G. MacKenzie, Inglewood, and Paul K. Bennett, Pasadena, Calif., assignors to Musicast, Inc., Los Angeles, Calif., a corporation of California Application May 25, 1951, Serial No. 228,208

20 Claims. (Cl. 250—6)

The following invention relates generally to the distribution of musical, dramatic, educational and other similar programs, and more particularly to a system for a radio broadcasting a conventionally "sponsored" program in a manner whereby the principal portion thereof can be segregated from other portions such as commercial announcements and the like. In the particular embodiment of the invention herein shown and described the entertainment program involved is a series of musical selections, although it will be realized that the system is equally effective for use with other types of intelligence, and is not limited to music.

It has been common practice in the past to provide musical entertainment to restaurants, barber shops, railroad station waiting rooms and similar localities by means of land lines, that is, leased telephone wires which are connected directly, or through a central switching station, from the source of music to the location of the subscriber.

Such leased wire facilities require, in order to accommodate music, special balancing of the lines which entails a considerable expense. Furthermore, the necessity of providing a special line makes it economically impossible for the relatively small subscriber that may be located in an outlying part of the community to take advantage of the service. The foregoing and other disadvantages of the leased wire system, such for example, as the necessity of rather elaborate maintenance of the entire wire network has prevented the land line system from coming into common and widespread use.

Bearing in mind the foregoing disadvantages, it is a major object of the present invention to provide a system by which musical programs or other entertainment may be broadcast by radio and made available to selected subscribers.

Another object of the invention is to provide means by which distributed entertainment programs may be combined in the usual way, with commercial announcements, or other non-entertainment messages, which messages may be discriminated against by the subscribers to the service whereby only the entertainment program will be heard by the subscriber.

Still another object of the invention is to provide a system of the class described which incorporates a special coding signal which effectively prevents "piracy" of the service by unauthorized receivers.

A further object of the invention is to provide a system of the class described in which two different types of material may be broadcast concurrently and in which subscribers may select one or the other or both types of material.

A still further object of the invention is to provide in a system of the class described an automatic transmitting circuit and apparatus by which all of the foregoing functions are carried out automatically and with a minimum necessity for operating personnel.

The foregoing and additional objects and advantages of the invention will be apparent from the following detailed description thereof, such consideration being given likewise to the attached drawings, in which.

Figure 1:
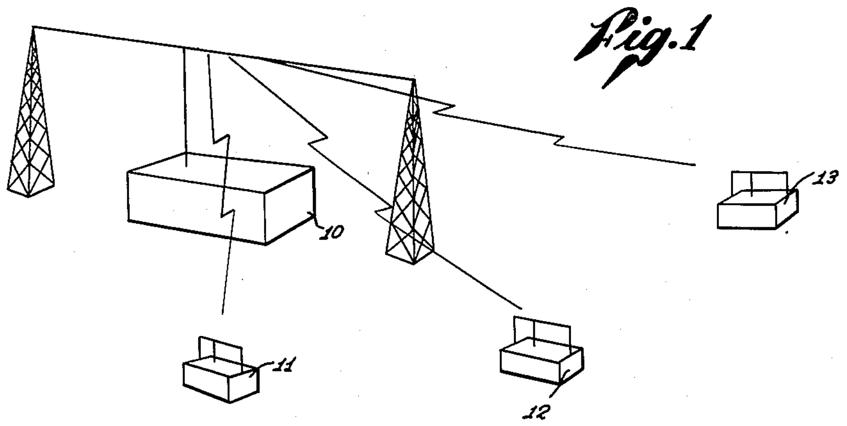
Figure 1 is a semi-schematic view of a radio transmitter and a plurality of receiving stations receiving messages transmitted by the transmitter.

In Figure 1 the reference character 10 identifies a radio transmitter station, the signal of which is being received by a plurality of receivers 11, 12 and 13, one of which, 11, is especially adapted by incorporating the invention herein, to receive and reproduce only certain selected portions of the program broadcast by the transmitter 10. The remaining receivers 12 and 13 are conventional.

The program being broadcast by the transmitter 10 is a conventional musical program interspersed with commercial announcements, and other messages of a non-entertainment character. Such program is received by conventional receivers 12 and 13 in the usual manner, the entire program being received and heard by them. In this way the expenses of operation of the transmitter 10 are in part borne by the revenue received from commercial sponsors whose advertisments are heard by conventional listeners.

In order to provide a coding signal by which selected receivers, e. g., 11, may be made to discriminate against certain portions of the program, a plurality of different supersonic (or if desired, sub-sonic) signals are superimposed on, i. e., mixed with the conventional signal 14, two such superimposed frequencies being identified herein as the "A" and "B" frequencies. The A and B frequencies are superimposed in a certain time relationship on the conventional program 14 so as to operate selectively on different parts of the program as will be hereinafter described in detail. Being supersonic, i. e., above the audible frequency range, and A and B signals are humanly insensible and do not in any way interfere with the conventional signal 14, hence listeners at conventional receivers 12 and 13 are entirely unaware of the code signals.

The selection just referred to is made by providing in the selective receivers certain components which are responsive to the code frequencies A and B and operate to render the selective receivers inoperative during the undesired portions of the program. The only receivers which are so rendered inoperative are those which embody the present invention. The receiver 11 is primarily a conventional frequency modulation receiver having an RF amplifier 20, a beat frequency oscillator 21, a multiplier 22, a mixer 23, I. F. amplifiers 24 and 25, a limiter 26, a discriminator 27, audio amplifiers 28 and 29, and a speaker 30. To the conventional elements of the receiver 11 is added a special disabling circuit hereinafter described in detail.

Figure 2:
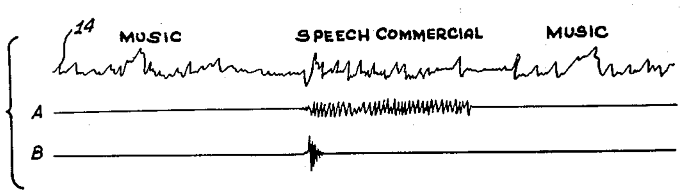
Figure 2 is a graphic representation of the radio signals transmitted by the transmitter shown in Figure 1.

As shown in Figure 2, the "disabling" code signal comprises two supersonic frequencies, one of which, termed hereinafter the "A" frequency, continues for the duration of the commercial, and the other of which, the "B" frequency, consists in a short pulse at the beginning of the commercial announcement. The A and B frequencies differ substantially from each other and are so selected that neither is a close harmonic of the other.

Figure 3:
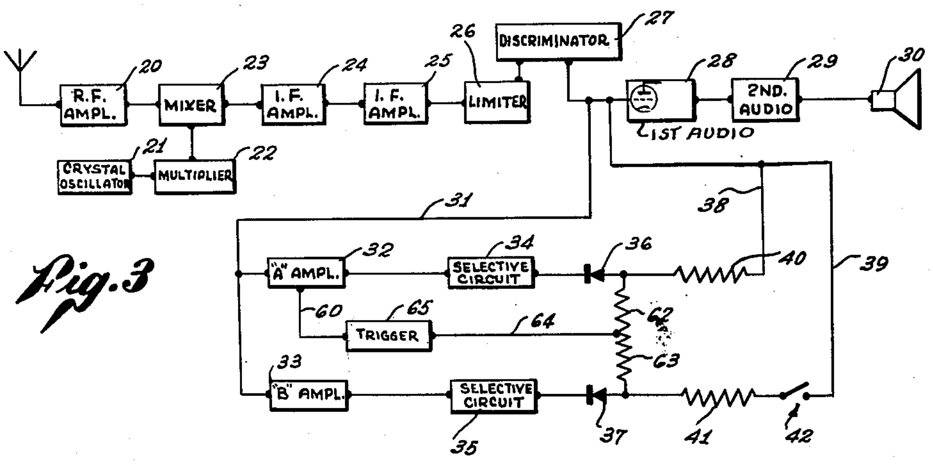
Figure 3 is a block diagram of a special "selective" receiver shown in Figure 1.
Figure 4:
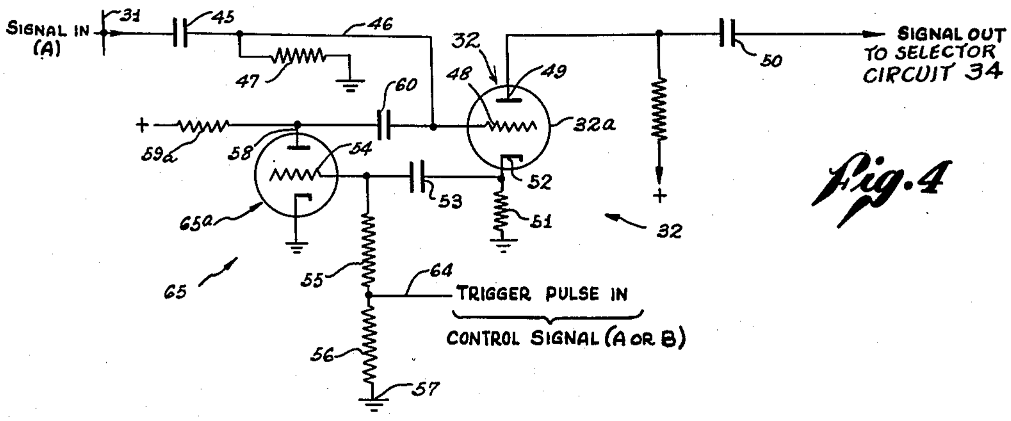
Figure 4 is a wiring diagram of parts of the circuits of Figure 3 illustrating a code responsive trigger circuit therein.

The circuit means by which the control frequencies (A and B) operate to disable the receivers are illustrated in Figures 3 and 4. In Figure 3 it will be seen that the output of the radio receiver is delivered to a first audio amplifier 28 and is also delivered through a conductor 31 to the inputs of two parallel amplifiers 32 and 33, further identified in the drawings as the "A" amplifier, and the "B" amplifier, respectively. The outputs of the amplifiers 32 and 33 are fed through selectors 34 and 35, respectively, which include band selection filters passing only the "A" frequency or the "B" frequency, respectively. The outputs of the selectors are in turn delivered through rectifiers 36 and 37, respectively, and in the illustrated embodiment of the invention, these rectifiers are converted (as indicated in the drawings) to deliver negative voltages through coupling resistors 40 and 41 and conductors 38 and 39, respectively, to the first audio amplifier 28. The conductors 38 and 39 are connected within the amplifier 28 in conventional manner, as for example, to the grid return of the first audio tube so that a strong negative voltage on either the conductor 38 or 39 renders the audio amplifier 28 inoperative.

A switch 42 is included in the conductor 39 leading from the B amplifier and selector circuit which switch is normally left open in which case the amplifier 28 is rendered inoperative only during speech commercials. Closure of the switch 42 operates in a manner hereinafter to be described to render the amplifier 28 inoperative not only during speech commercials but also during selected musical periods.

It will be noted that the outputs of the two rectifiers 36 and 37 are delivered through the halves of a center tapped coupling resistor 62—63 and a conductor 64 to a trigger circuit 65 the details of which are illustrated in Figure 4.

The operation of the "disabling" circuit is as follows: Let it be assumed that the transmitted program is nearing the end of a musical period and that a speech commercial is about to be broadcast. At such time (referring to Figure 4) the musical audio signal is applied, as shown, to the input of the A amplifier 32. Such signal is applied through a coupling condenser 45 and a conductor 46 to the grid 48 of the first vacuum tube 32*a* in the amplifier 32, a grid resistor 47 being connected in the usual manner. For reasons hereinafter to be described, the signal reaching the grid 48 of the amplifier tube 32*a* is comparatively small, and the resulting signal produced on the plate 49 of the tube 32*a* coupled in the usual manner by coupling condenser 50 to the selector circuit 34, is of insufficient amplitude to produce a negative signal sufficiently strong to disable the amplifier 28.

The signal current flowing in the amplifier tube 32*a* is sufficient however to produce a small signal voltage at the cathode 52 thereof (by reason of the cathode resistor 51) which signal is delivered through a coupling condenser 53 to the grid 54 of a vacuum tube 65*a* in the trigger circuit 65. The tube 65*a* is normally operated at zero bias by returning the grid 54 to ground, as at 57, through series connected grid resistances 55 and 56.

Thus, the tube 65*a* normally operates as an amplifier providing substantial gain so as to normally develop across a plate load resistance 59*a* relative strong output signals. Such signal is, it will be noted, inverted in phase with respect to the signal voltage applied through the conductor 46 to the grid 48 of the amplifier tube 32*a*. The inverted signal from the trigger tube 65*a* is applied through an appropriate coupling condenser 60 to the grid 48 of the amplifier tube 32*a* and being in reverse phase smothers the operation of the tube 32*a*. It will also be noted that by reason of normally operating at zero bias, the tube 65*a* is normally highly conductive and so acts as a low impedance shunt from conductor 46 to ground. Thus, a substantial proportion of the signal delivered through the conductor 46 is bled off through the trigger tube 65*a* to ground causing a further reduction of the signal voltage on the grid of tube 32*a*.

Let it now be assumed that the B frequency trigger pulse is received by the receiver and delivered through the conductor 31 to the input of the B amplifier 33 and thence through the selector 35, the rectifier 37, and the resistor 63, to the conductor 64. The conductor 64 is connected to the common terminal of the series connected resistors 55 and 56 so that the resulting negative going rectified pulse is applied to the grid 54 of the trigger tube 65*a*. As was previously stated, the result of applying this strong negative voltage to the grid 54 of tube 65*a*, is to render the tube non-conductive and substantially inoperative. The result of this, in turn, is to render the amplifier tube 32*a* operative since the signal voltage applied through the conductor 46 is no longer bled off through the tube 65*a* and also no reverse phase signal is delivered from the tube 65*a*. Thus it will be seen that upon reception of the B pulse the tube 32a becomes operative, and as hereinbefore described, a strong negative voltage is applied through the conductor 38 to the audio amplifier 28 to render the same inoperative.

It will also be remembered that at the time the B pulse is transmitted the continuous A signal frequency also commences. This frequency is delivered through the now operative A amplifier 32, the selector 34, the rectifier 36, the resistor 62, and the conductor 64 to the grid 54 of the trigger tube 65a thus serving to hold the trigger tube 65a in a non-conductive, non-amplifying condition for so long a period as the A frequency persists. As indicated by the graphic representations in Figure 2, the A frequency persists for the duration of the speech commercial and thus the audio amplifier 28 is inoperative during the entire speech commercial. Note that in the absence of the B frequency trigger pulse, the A frequency signal can never gain control and disable the amplifier 28.

As has been previously discussed, it is one object of the present invention to provide an arrangement by which receivers can be set to reject certain musical selections. The circuit comprising the coupling resistor 41, the switch 42, and the conductor 39 leading from the B amplifier circuit 33—35—37 is for this purpose. Whenever the switch 42 is closed, the output of the B frequency circuit is delivered directly to the amplifier 28 as previously described and disables the same.

Thus each record which it is desired to discriminate against is accompanied by continuous transmission of B frequency which results in rendering the amplifier 28 inoperative during the duration of such record.

It will be seen that the occasional substitution of a continuous B frequency signal instead of the pulse signal illustrated in Figure 2, will not interfere with the operation of disabling the amplifier 28 during the speech commercial. This is due to the fact that the trigger tube 65 is held in a non-conductive and non-amplifying condition whenever a negative signal voltage is applied to the conductor 64 whether this be the signal resulting from the B frequency or A frequency.

In order to prevent piracy, i. e., unauthorized use of the disabling features of the broadcast signal, the A and B amplifiers 32—33 and the associated selective circuits 34 and 35 may be constructed as separable "plug in" units which can be interchanged with units of differing frequency responses or interchanged with each other, thereby foiling the would-be "pirate." Also the fact that the B triggering pulse is extremely short makes it extremely difficult for the uninitiate to detect such pulse in the transmitted signal and also difficult to measure the frequency thereof so as to build a receiver corresponding to the receiver 11 herein. It will be realized of course that whenever changes are made in the frequency response of the selected receivers, such as by interchanging the A and B frequency responsive units appropriate and corresponding changes must be made in the character of the transmitted control signals.

Figure 5:
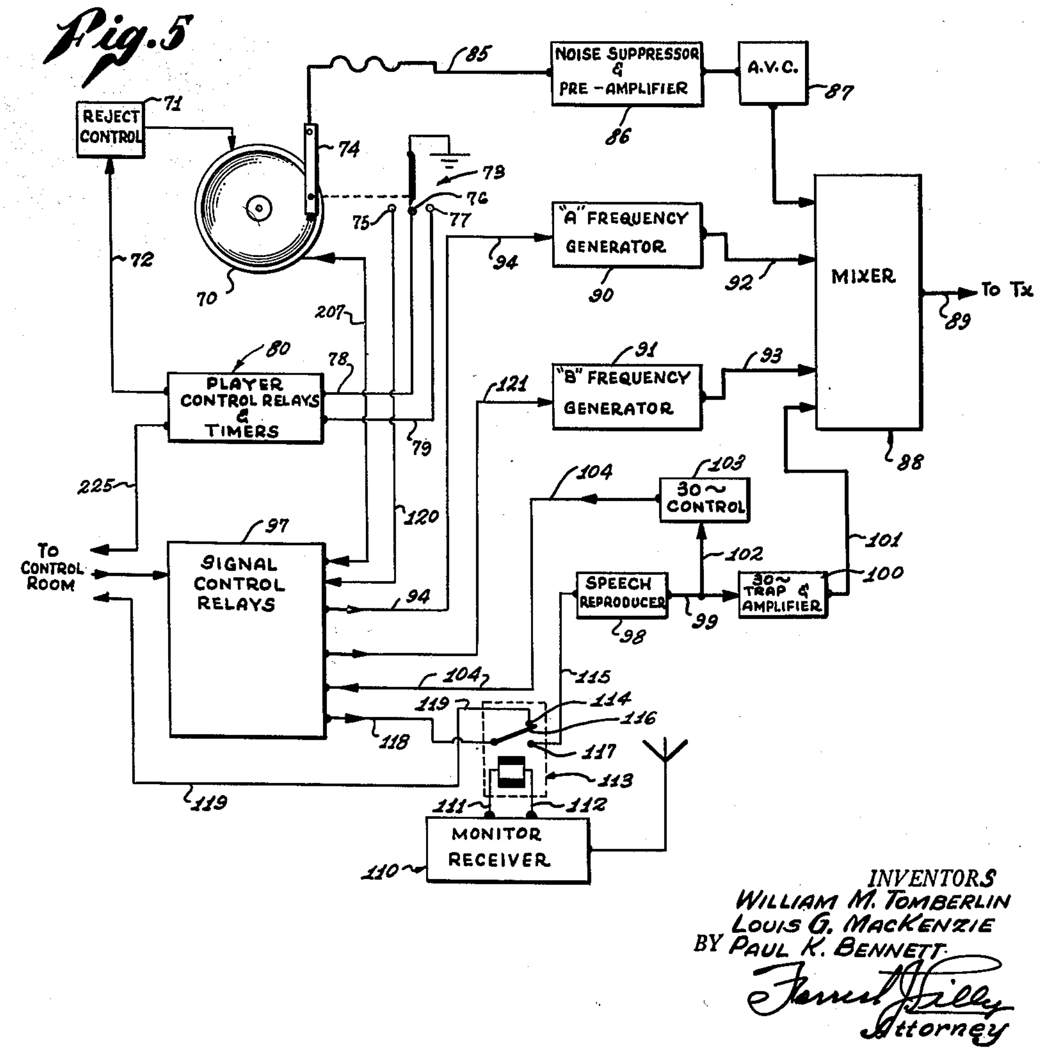
Figure 5 is a block diagram of the transmitting apparatus and control circuit in the transmitter of Figure 1.

Turning now to a discussion of the automatic transmission apparatus and associated control circuits, reference should be had to Figure 5—wherein voice transmission conductors are shown in heavy line and control signal conductors in light lines. The musical or other entertainment portion of the program broadcast by the transmitter 10 originates in a conventional automatic record player 70 which is adapted to operate continuously without attention, and to play ten and twelve inch phonograph record disks intermixed. Such phonograph record players being well known in the art, no detailed description thereof is deemed necessary herein. Suffice it to say therefore that the player 70 is provided with various electric controls, among which is a reject control 71 which when actuated by a signal through a signal conductor 72 operates to reject the then-playing record, and advance the player to the next record.

The player 70 is also provided with a three position control switch 73 mechanically coupled to the tone arm 74 whereby one of three fixed contacts 75—76—77 is grounded depending on the then position of the tone arm 74. When the end of any record is reached, the fixed contact 75 is grounded; at the beginning of a ten inch record the contact 76 is grounded; and at the beginning of a twelve inch record the contact 77 is grounded.

Operation of the record player 70 is automatically controlled by a control circuit 80 receiving its actuating signals through conductors 78 or 79 from the "record "start" contacts 76 or 77, respectively, of the tone arm actuated switch 73. The output signals of the player control circuit 80 are (1) the reject control actuating signal delivered through the conductor 72 and (2) a warning signal delivered to the control room through conductor 225.

The acoustical (music) signal picked up by the tone arm 74 is translated and delivered through a conductor 85, through a conventional noise suppressor and preamplifier 86, and an automatic volume control 87 to the mixer 88 of the transmitter. From the mixer 88 the signal is transmitted through a conductor 89 in a conventional fashion to the radio transmitter itself.

Two frequency generators 90 and 91 produce the A and B control frequencies respectively which are delivered through conductors 92 and 93, respectively, to the mixer 88 to be mixed with other signals and broadcast at certain times during the program. The signal generators 90 and 91 operate as previously described during certain predetermined periods related to the overall program and receive their actuating control signals through conductors 94, and 121 from a signal control unit 97. The generators 90—91 are constructed as separate easily disconnectable units so that they may be replaced to correspond to "anti-piracy" changes in the receivers 11.

The commercial announcements and other speech portions of the overall program are provided by a conventional speech reproducer 98 which may be for example, a magnetic tape reproducer of conventional design. The commercial announcements on the speech reproducer record are recorded in immediate succession, the series of individual messages being separated by low frequency control tones each of approximately one second duration. A frequency of 30 cycles for such control tone has been found effective in the illustrated embodiment.

The output of the speech reproducer 98 is delivered through a conductor 99 to an amplifier 100 which incorporates a 30 cycle band rejection filter, and the output of the amplifier 100 is delivered through a conductor 101 to the mixer 88 where it is mixed with the A and B frequencies. As will hereinafter appear, the interlocking control circuit operates to prevent audio signals from the speech reproducer 98 and from the record player 70 being delivered simultaneously to the mixer 88.

The output of the speech reproducer 98 is also delivered through a branch conductor 102 to a 30 cycle control circuit 103 which is selectively responsive to the 30 cycle input and incorporates a relay or other conventional means to produce a control potential whenever the 30 cycle tone appears at the control circuit input. The control potential produced in the circuit 103 is delivered through a conductor 104 to the signal control unit 97.

To assure continued proper operation of the system, a monitor receiver 110 is provided and is tuned to receive the output of the transmitter 10. The monitor receiver 110 incorporates appropriate band pass filters and rectifiers so as to produce a relay actuating potential at output conductors 111 and 112 whereby to actuate a relay 113 whenever the receiver 110 receives the A and B frequencies transmitted by the transmitter 10. The operation of the monitor receiver 110 is similar to that of the receiver 11 which was described previously, and which is illustrated in Figures 3 and 4. Instead of operating to disable the audio system of the receiver, however, the potential delivered through the conductor 38 in Figure 3 is the relay operating potential appearing across the output conductors 111 and 112 in Figure 5.

The mechanical drive of the speech reproducer 98 is arranged to operate only when a control potential is delivered through an actuating conductor 115 to the speech reproducer 98. Such actuating potential can only be delivered when the relay 113 is actuated to pull the movable contact 116 thereof down against the fixed contact 117 to which the conductor 115 is connected. The control potential for the speech reproducer 98 is itself delivered from the signal control unit 97 through a conductor 118. In the event that the relay 113 has not been actuated when a signal potential appears on the conductor 118, such potential will be delivered to the control room through a back contact 114 and a conductor 119 to operate a warning bell or other signal in the control room, whereby to notify the control engineer that the control frequencies from the generators 90 and 91 are not appearing in the output of the transmitter 10. Suitable standby program facilities are conventionally provided in the control room so as to "take over the program" while repairs are being made.

Figure 6:
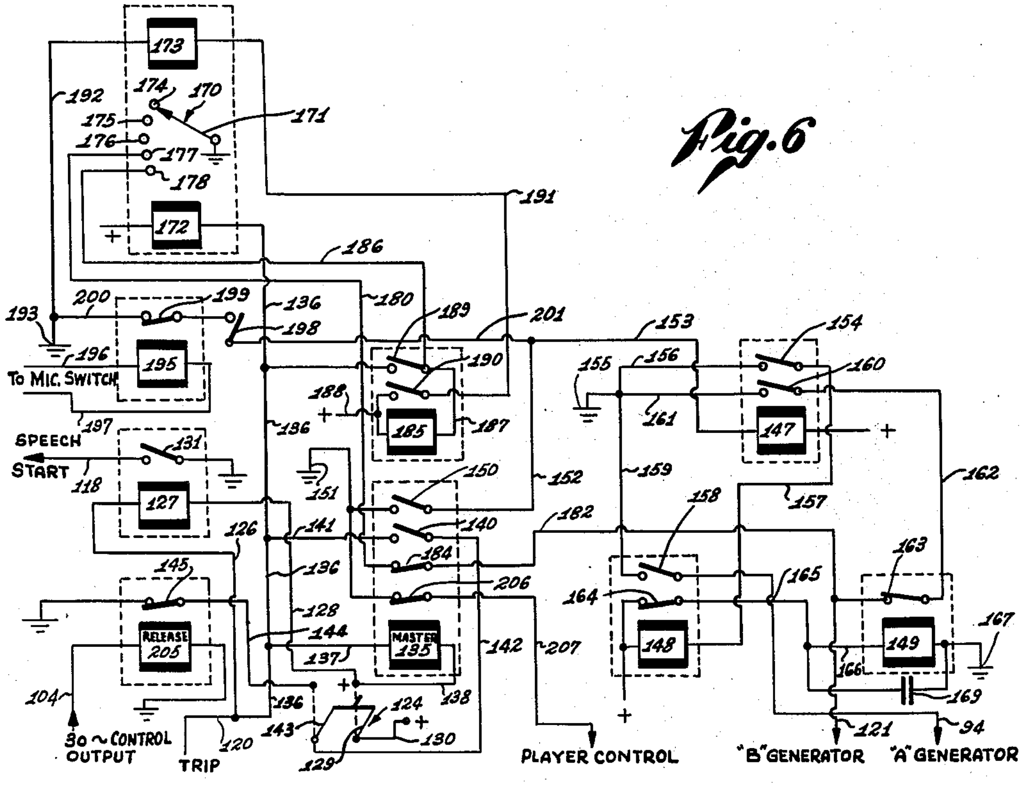
Figure 6 is a wiring diagram of the signal control relays in Figure 5.

Turning now to a discussion of the control unit 97, reference should be had to Figures 5 and 6. Before describing the circuit elements of the unit 97 in detail and the operation thereof, it is well to review briefly the functions which the control circuit is to perform. Considering that the cycle of control operations begins when the player 70 has just finished a record, the functions which must be performed are as follows:

1. The commercial speech reproducer 98 must start.

2. Simultaneously with the start of the reproducer 98, the A frequency generator 90 must start and continue during the commercial speech.

3. The B frequency generator must produce at least a brief pulse, and if the next record which will be played by the player 70 is one which is to be received by only selected receivers in which the switch 42 is closed, the B frequency generator 91 must be placed in steady state operation, to continue through the playing of the next succeeding record.

4. Whenever it is desired to make an oral announcement during the playing of a record, it must be possible to accompany such oral announcement with the transmission of the A and B frequencies in their proper code sequence so as to render the selective receivers 11 inoperative during such announcement period.

5. When the regular oral or commercial announcement of the reproducer 98 is completed, the player 70 must again be started and the A and B frequencies stopped.

The cycle of operation of the signal control unit 97 is initiated by a momentary "ground" produced by closure of the movable blade of the switch 73 against its contact 75. The contacts of the switch 73 are arranged so that the closure is momentary only and such momentary contact mechanisms being well known in the art no specific description or illustration thereof is deemed necessary herein. The momentary ground just described is delivered through conductor 120 to the signal control relay circuit 97, as shown in Figure 5.

Referring to Figure 6 it is first noted that for the sake of simplification in the drawings, all the above-ground potential points, such as the source of relay operating voltages, are indicated by a "plus" symbol, although it will be realized that in practice these voltages may vary as between themselves. Thus whenever a circuit is completed from a "plus" point through a relay to ground such relay is operated. Also each of the relays is designated in its entirety by the number given to its operating coil.

The first of the schedule of operations, to-wit, the starting of the speech reproducer is accomplished by momentarily completing a circuit from the conductor 120 through a conductor 126, a relay coil 127, a conductor 128, one side 129 of a main control switch 124, and a conductor 130 to plus potential. Actuation of the relay coil 127 closes the normally open contact 131 thus grounding the "speech start" conductor 118 to start the speech reproducer 98 in a manner previously described. It will be remembered that the reproducer 98 will not start unless the movable relay contact 116 is closed against the fixed contact 117 by operation of the monitor receiver relay 113. It will be noted that the ground conductor 126 is tied to a bus 136 to which a "self locking" ground potential is applied as will hereinafter appear.

The actuation of the A and B frequency generators necessitates first the energization of a master relay 135 which is accomplished through completion of a circuit from the momentary ground or "trip" conductor 120 through the bus 136, a branch conductor 137, the relay coil 135, and a conductor 138 to the plus side of the master switch 124. In order for the cycle to continue the master relay 135 (and the relay 127) must be locked in energized position. This is accomplished by a locking circuit comprising a normally open contact 140 of the master relay 135 which is closed by the momentary grounding just described. Closure of the contact 140 places a ground on the bus 136 by means of a circuit including conductors 141, and 142, through the ground side 143 of the master switch 124 and thence through a conductor 144 and a normally closed relay contact 145 to ground, as shown.

Both the A and B generators contain relays within themselves arranged to start the generator on grounding thereof, and to stop the same upon removal of such ground. The actuation and sequencing of the A and B generators is accomplished by three inter-connected relays 147, 148 and 149. Energization of the master relay operates through closure of a normally open contact 150 to complete a circuit from ground at 151 through conductors 152 and 153 to energize the relay 147.

Actuation of the relay 147 in turn operates through a normally open contact 154 thereof to complete a circuit from ground at 155 through conductors 156 and 157 to actuate the relay 148. Actuation of the relay 148 closes the normally open contact 158 thereof to ground the A generator starting conductor 94 by completing a circuit through conductor 159 to ground at 155.

At the same time that the A generator is started as just described, closure of a normally open contact 160 in the relay 147 completes a circuit through conductors 161 and 162 and a normally closed relay contact 163 in the relay 149 to the B generator starting conductor 121. It will be noted that the relay 149 is a normally energized relay operating to hold the contact 163 closed. Holding voltage is normally delivered thereto through a normally closed contact 164 in the relay 148 and conductors 165 and 166 to ground at 167.

In order to delay the opening of the normally closed relay contact 163 when the relay 149 is de-energized by actuation of the relay 148, a condenser 169 is connected across the coil of the relay 149. Thus, while the operation just described serves to start both the A and B generators at substantially the same instant, a very short time thereafter, the discharge of the condenser 169 allows the contact 163 to open, thus terminating the operation of the B generator after a short pulse.

The selection of certain records which will not be heard by certain selectively adjusted receivers (those with the switch 42 closed) is accomplished by a predetermined arrangement of the series of records on the player 70. Control of the signal circuits so as to transmit a continuous B frequency signal during such selected records is accomplished by means of a stepping switch 170 having a movable grounded contact 171 which is advanced by a solenoid coil 172 each time the trip conductor 120 is grounded, and is returned to a home position by a homing solenoid coil 173 in a manner hereinafter to be described. Stepping switches of this type being well known in the art, a detailed description of the construction thereof is not necessary herein. Suffice it to say that the switch 170 has a number of sequential positions, five being shown for purposes of illustration herein, and being numbered 174 through 178. As will be understood from a detailed description to follow, the home position 174 is equivalent to the final position 178 in that when the movable contact 171 reaches the final position 178 it is at once automatically returned to the home position 174.

Let it be assumed that every fourth record in the series being played by the player 70 is one which it is desired to discriminate against at certain selected receivers. Accordingly, the fourth position 177 of the switch 170 is connected by a conductor 180 through a normally closed contact 184 of the master relay 135 and a conductor 182 to the B generator start conductor 121. The result is that when the movable contact 171 of the stepping switch 170 reaches the fourth position 177, the B generator starting conductor 121 is grounded and remains grounded until the next advance of the switch 170.

It is apparent that due to the fact that the normally closed contact 184 is opened by the actuation of the master relay 135, the B generator will not be energized as soon as the movable contact 171 reaches the fourth position 177 if the master relay is, at that time, energized. As soon as the master relay 135 is de-energized however, and the contact 184 returns to its normally closed position, then if the movable contact 171 of the stepping switch 170 is positioned at the fourth position 177, a circuit will be completed through the conductors 180 and 182 to the start conductor 121 of the B generator. Also it will be apparent that the B generator will continue in operation until the master relay is again actuated at the end of the selected record. Such actuation will move the movable contact from the fourth position 177 so that on the next record, the B generator will produce only a pulse in the manner previously described.

Return of the movable contact 171 of the stepping switch 170 is controlled by a return relay 185 which is energized when the movable contact 171 reaches the final position 178, thus completing a circuit from ground through conductors 186 and 187 through the coil 185 to plus potential at 188. It will be recalled that the bus 136 is grounded through the self-locking contact 140 of the master relay 135 and the same bus 136 is used to lock the relay 185 closed through the operation of the normally open contact 189. Actuation of the relay 185 also closes a normally open contact 190 to complete a circuit from plus potential at 188 through a conductor 191, the homing coil 173, and a conductor 192 to ground at 193. Thus the movable contact 171 is returned to its home position 174 and the fact that it is removed from the final position 178 does not de-energize the homing coil 173 due to the operation of the relay 185.

If it is desired to make an oral announcement from the control room during the normal cycle of operations of the signal control circuit which announcement will not be heard by the receivers 11 this may be accomplished by the operation of an interruption relay 195 which is connected through conductors 196 and 197 to the control room for selective manual operation. The conductors 196 and 197 are normally interconnected by a switch (not shown) in the control room. A manually operable switch 198 is also included in the circuit and is closed to energize the relay 195 and place the system in readiness for such oral interruptions.

The normal operating condition of the system when the interruption relay 195 is included therein is with the coil 195 energized, thus holding the contact 199 open. When it is desired to interrupt the system to make an announcement, the circuit including the conductors 196 and 197 is broken, thus de-energizing the coil 195, permitting the contact 199 to close and completing a circuit from ground at 193 through conductors 200 and 201, 153, through the sequencing relay 147 to plus potential. This closes the relay 147 and operates the A and B generators in the manner previously described.

It will be remembered that when the commercial message delivered by the speech reproducer 98 is completed, the low frequency signal recorded on the record actuates the control unit 103 to produce a control potential on the conductor 104. The control potential is delivered to a release relay 205 and actuates the same to open a normally closed contact 145. This serves to remove the locking ground from the master relay 135 permitting the same to open. De-energizing of the master relay 135 permits openings of the contact 150, removing the ground from the sequencing relay 147 and stopping the operation of the A generator. Since the locking ground is also removed from the bus 136, the relay 185, if closed, is de-energized. De-energization of the master relay 135 also permits a normally closed but then open contact 206 to close delivering a control ground signal through a conductor 207 to the player 70 to start the same.

Thus it will be seen that the operation of the system is completely automatic, and once started will complete the playing of an entire series of records loaded into the player 70.

It is desirable that in the event of a faulty record appearing in the series on the player 70, such as one having for example a discontinuous groove, or the like, the operation continue to advance regardless of such defect. In other words, the sequencing of the system as thus far described is dependent on continuous operation of the player 70, and means must be incorporated to take care of record failures of the type described. In order to provide for such record failures, the player control circuit 80 illustrated in Figure 7 is provided.

The player control 80 includes two branch circuits, one having to do with 10″ records (three minutes) and one having to do with 12″ records (four minutes) played on the player 70. Description of the 10″ record timing circuit suffices for both circuits. The timing circuit includes a coupling relay 210 connected to be actuated by the 10″ start conductor 78, which, it will be remembered, is grounded at the start of a 10″ record by the operation of the switch 73. Energization of the relay 210 closes a contact 211 delivering plus potential from a bus 213 through a conductor 214 to a timing clock 216 grounded at 217. This starts the clock.

Figure 7:
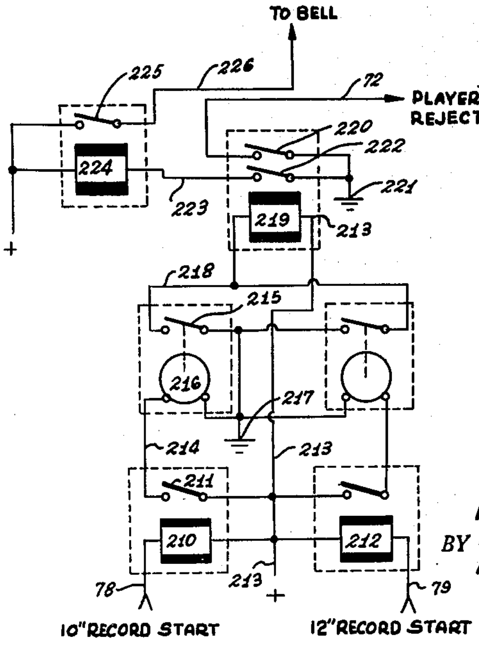
Figure 7 is a wiring diagram of the phonograph record player control relays and timers in Figure 5.

The clock 216 which is shown schematically in Figure 7, is mechanically connected to a normally open contact 215 so that the latter is closed after the clock has been in operation for a predetermined length of time (three minutes in the case of 10″ records). Closure of the contact 215 energizes a signal relay 219 by completing a circuit from ground at 217 through a conductor 218 to the plus potential bus 213.

Energization of the signal relay 219 grounds the reject control conductor 72 causing the then playing record to be rejected and causing the player 70 to advance to the next record. A second normally open contact 222 in the signal relay is also closed completing a circuit through a conductor 223 to operate a relay 224 and deliver plus potential through a signal conductor 226 to the control room to ring a bell (not shown) or similarly to warn the operator that the performance of the record player 70 is faulty.

As can be seen clearly in Figure 5, attempted operation of the speech reproducer as by grounding the conductor 118 through the operation of the relay 127 will, in the event that the monitor receiver 110 has not heard the A and B frequencies, ground the conductor 119 and thus signal the control room that the system is not operating properly.

While the system, apparatus and circuits shown and described herein are fully capable of achieving the objects and providing the advantages hereinbefore stated it will be realized that they are capable of considerable modification without departure from the spirit of the invention. For this reason we do not mean to be limited to the forms shown and described but rather to the scope of the appended claims.

We claim:

1. In combination with a transmitter for distributing a program for selective audible reproduction at a plurality of receivers: first and second intermittently operable players connected to feed said transmitter and each adapted to play a series of portions of said program; control means coupled between said players and responsive to the termination of a portion played by either of the said players to start the other thereof whereby to produce an intermixed sequence of said portions; coding means operatively connected to said control means and to said transmitter and responsive to termination of a portion played by said first player to superimpose on the succeeding portion played by said second player, a signal of predetermined character; and a monitor receiver at said transmitter connected to said second player to normally deactivate the same, said monitor receiver being responsive to said signal to activate said second player only upon receipt of said signal.

2. In combination with a transmitter for distributing a program for selective audible reproduction at a plurality of receivers: first and second intermittently operable players connected to feed said transmitter and each adapted to play a series of portions of said program; an interlocking circuit coupled between said players whereby said players mutually control each other to produce an intermixed sequence of said portions combining to form said program; a first inaudible frequency signal generator connected to feed transmitter; a second inaudible frequency signal generator connected to feed said transmitter; and signal control means in said circuit responsive to termination of a portion played by said first player to activate said generators to superimpose the signals thereof on the succeeding portion played by said second player, said control means including a time delay element coupled to said second signal generator to terminate the operation thereof a predetermined, relatively short time after activation thereof to produce a short signal pulse of said second inaudible frequency at the start of said succeeding portion.

3. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, a normally inactive disabling means for said reproducing means, a vacuum tube amplifier for the second of said control signals having its input grid circuit coupled to said detecting means, circuit means utilizing the output signal from said amplifier to activate said disabling means for said reproducing means, a trigger device for said amplifier including a triggering vacuum tube amplifier, means impressing on the grid circuit of said triggering amplifier an output voltage from the first mentioned amplifier, circuit means taking an output voltage from said triggering amplifier whose phase is reversed from the input voltage impressed on the first mentioned amplifier and impressing it on the grid circuit of the first mentioned amplifier, thereby developing a degenerative feedback effect which disables said first mentioned amplifier, an amplifier for the first of said control signals coupled to said detecting means, a rectifier for rectifying the output voltage of the last mentioned amplifier, and circuit means utilizing the last mentioned rectified voltage to develop a negative voltage and impress it as a bias on the grid of said triggering amplifier, so as to reduce the degenerative output signal from said triggering amplifier and thereby clear said first mentioned amplifier for amplification of said second control signal.

4. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, a normally inactive disabling means for said reproducing means, a vacuum tube amplifier for the second of said control signals having its input grid circuit coupled to said detecting means, circuit means utilizing the output signal from said amplifier to activate said disabling means for said reproducing means, a trigger device for said amplifier including a triggering vacuum tube amplifier, means impressing on the grid circuit of said triggering amplifier an output voltage from the first mentioned amplifier, circuit means taking an output voltage from said triggering amplifier whose phase is reversed from the input voltage impressed on the first mentioned amplifier and impressing it on the grid circuit of the first mentioned amplifier, thereby developing a degenerative feedback effect which disables said first mentioned amplifier, an amplifier for the first of said control signals coupled to said detecting means, a rectifier for rectifying the output voltage of the last mentioned amplifier, circuit means utilizing the last mentioned rectified voltage to develop a negative voltage and impress it as a bias on the grid of said triggering amplifier, so as to reduce the degenerative output signal from said triggering amplifier and thereby clear said first mentioned amplifier for amplification of said second control signal, a rectifier for rectifying the output signal from said first mentioned amplifier, and circuit means developing a negative voltage from the output of the last mentioned rectifier and impressing said negative voltage as a bias on the grid of said triggering amplifier, in such manner as to lock said triggering amplifier in a negatively biased condition preventing resumption of its disabling action on the first mentioned amplifier after cessation of said first control signal.

5. The subject matter of claim 4, wherein there is included, in circuit with the first mentioned amplifier, frequency selective circuit means passing selectively the frequency of said second control signal, and, in circuit with the amplifier for said first control signal, frequency selective circuit means passing selectively the frequency of said first control signal.

6. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, a normally inactive disabling means for said reproducing means, a vacuum tube amplifier for the second of said control signals having its input grid circuit coupled to said detecting means, circuit means utilizing the output signal from said amplifier to activate said disabling means for said reproducing means, a trigger device for said amplifier including a triggering vacuum tube amplifier, means impressing on the grid circuit of said triggering amplifier an output voltage from the first mentioned amplifier, circuit means taking an output voltage from said triggering amplifier whose phase is reversed from the input voltage impressed on the first mentioned amplifier and impressing it on the grid circuit of the first mentioned amplifier, thereby developing a degenerative feedback effect which disables said first mentioned amplifier, an amplifier for the first of said control signals coupled to said detecting means, a rectifier for rectifying the output voltage of the last mentioned amplifier, said rectifier polarized to deliver a negative voltage, and circuit means coupling the output side of said rectifier to the grid of said triggering amplifier to negatively bias said amplifier toward cutoff and thereby reduce the degenerative output signal from said triggering amplifier to clear said first mentioned amplifier for amplification of said second control signal.

7. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, a normally inactive disabling means for said reproducing means, a vacuum tube amplifier for the second of said control signals having its input grid circuit coupled to said detecting means, frequency selective means in circuit with said amplifier selectively passing said second control signal, circuit means utilizing the output signal from said amplifier to actuate said disabling means for said reproducing means, a trigger device for said amplifier including a triggering vacuum tube amplifier, means impressing on the grid circuit of said triggering amplifier an output voltage from the first mentioned amplifier, circuit means taking an output voltage from said triggering amplifier whose phase is reversed from the input voltage impressed on the first mentioned amplifier and impressing it on the grid circuit of the first mentioned amplifier, thereby developing a degenerative feedback effect which disables said first mentioned amplifier, an amplifier for the first of said control signals coupled to said detecting means, frequency selective means in circuit with the last mentioned amplifier selectively passing the said first control signal, a rectifier for rectifying the output voltage of the last mentioned amplifier, said rectifier polarized to deliver a negative voltage, circuit means coupling the output side of said rectifier to the grid of said triggering amplifier to negatively bias said amplifier toward cutoff and thereby reduce the degenerative output signal from said triggering amplifier to clear said first mentioned amplifier for amplification of said second control signal, a rectifier for rectifying the output signal from the first mentioned amplifier, said rectifier polarized to deliver a negative voltage, and circuit means coupling the output side of said rectifier to the grid of said triggering amplifier to negatively bias said amplifier toward cutoff and thereby lock said triggering amplifier out of operation for the duration of said second control signal.

8. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, said means including an audio vacuum tube amplifier, a disabling vacuum tube amplifier for the second of said control signals having its grid circuit coupled to said detecting means, a rectifier for rectifying the output voltage of the last mentioned amplifier, said rectifier polarized to deliver a negative voltage, means coupling the output side of said rectifier to the grid circuit of said audio amplifier to bias the latter to cutoff, a trigged device for said disabling vacuum tube amplifier including a triggering vacuum tube amplifier, means impressing on the grid circuit of said triggering amplifier an output voltage from said disabling amplifier, circuit means taking an output voltage from said triggering amplifier whose phase is reversed from the input voltage impressed on the disabling amplifier, and impressing it on the grid circuit of said disabling amplifier, thereby developing a degenerative feedback effect which disables said disabling amplifier, an amplifier for said first control signal coupled to said detecting means, a rectifier for rectifying the output voltage of the last mentioned amplifier, said last metioned rectifier polarized to deliver a negative voltage, and means coupling said last mentioned rectifier to the grid circuit of said triggering amplifier to negatively bias said amplifier toward cutoff and thereby reduce the degenerative output signal from said triggering amplifier to clear the disabling amplifier for amplification of the second control signal.

9. The subject matter of claim 8, including also means coupling the output side of the rectifier for the amplified second control signal to the grid circuit of the triggering amplifier to negatively bias said amplifier toward cutoff and thereby lock said triggering amplifier out of operation for the duration of said second control signal.

10. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, said means including an audio vacuum tube amplifier, a disabling means comprising an amplifier tube and circuit selective to said second control signal, said tube having its grid circuit coupled to said detecting means, a resistance in the cathode circuit of said tube across which a voltage is developed of the same phase as the input control signal voltage impressed on said tube, a rectifier for rectifying the output voltage from said amplifier tube, said rectifier polarized to deliver a negative voltage, means coupling the output side of said rectifier to said audio amplifier to bias the latter to cutoff, a trigger amplifier tube, means impressing on the grid circuit of said trigger tube the voltage developed across said cathode resistance of the first mentioned tube, means impressing the reversed phase output voltage of said trigger tube on the grid circuit of the first mentioned amplifier tube, so as to buck the control signal voltage impressed on the latter, an amplifier for said first control signal, circuit means in circuit with the last mentioned amplifier selectively responsive to said first control signal, a rectifier for rectifying the output voltage from the last mentioned amplifier, said last mentioned rectifier polarized to deliver a negative voltage, means coupling the last mentioned rectifier to the grid circuit of said trigger tube so as to bias the latter toward cutoff, and means coupling the first mentioned rectifier to said grid circuit of said trigger tube so as to bias said tube toward cutoff.

11. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, said means including an audio vacuum tube amplifier, a disabling means comprising an amplifier tube and circuit selective to said second control signal, a grid circuit for said tube coupled to said detector and including a grid return resistor, a resistance in the cathode circuit of said tube across which is developed a voltage in phase with the control signal voltage impressed on its grid circuit, a rectifier for rectifying the output voltage from said disabling amplifier tube, said rectifier polarized to deliver a negative voltage, a circuit including a resistor coupling the output side of said rectifier to the grid circuit of said audio amplifier, a trigger amplifier tube, a circuit lead including a coupling condenser connecting the cathode of said disabling amplifier tube to the grid of said trigger tube, so as to impress the voltage across the cathode resistor on the grid of the trigger tube, a resistor in the plate circuit of said trigger tube across which is developed a voltage of phase reversed from that originally impressed on the grid circuit of the disabling amplifier tube, a coupling circuit including a condenser connecting said plate resistance in parallel with the grid return resistor of the disabling amplifier tube, whereby the reversed phase output from the trigger tube bucks the control signal input to the disabling amplifier tube, an amplifier for the first control signal, circuit means in circuit therewith selectively responsive to said first control frequency, a rectifier for rectifying the output voltage from the last mentioned amplifier, said rectifier polarized to deliver a negative output voltage, rectifier loading resistors connected to the output sides of the two rectifiers, two grid circuit resistors in series in the grid circuit of said trigger tube, and circuiting connecting said loading resistors to the grid circuit of the trigger tube between said series connected grid circuit resistors.

12. The subject matter of claim 11, having also a normally open circuit lead including a coupling resistor and a switch connecting the output side of the rectifier for the first control signal to the grid circuit of the audio amplifier.

13. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, a normally inactive disabling means for said reproducing means, a vacuum tube amplifier for the second of said control signals having its input grid circuit coupled to said detecting means, circuit means in circuit with said amplifier selectively passing said second control signal, circuit means utilizing the output signal from said amplifier to activate the disabling means for said reproducing means, bucking means developing from said second control signal a signal voltage whose phase is reversed from the phase of said second control signal impressed on the grid circuit of said amplifier and impressing said reversed phase voltage on said grid circuit so as to buck said second control signal and thereby disable said amplifier, and means coupled to said detecting means selectively responsive to said first control signal for disabling said bucking means and thereby rendering said amplifier operative.

14. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly reproduce said program signal, a normally inactive disabling means for said reproducing means, a vacuum tube amplifier for the second of said control signals having its input grid circuit coupled to said detecting means, circuit means in circuit with said amplifier selectively passing said second control signal, circuit means utilizing the output signal from said amplifier to activate the disabling means for said reproducing means, bucking means developing from said second control signal a signal voltage whose phase is reversed from the phase of said second control signal impressed on the grid circuit of said amplifier and impressing said reversed phase voltage on said grid circuit so as to buck said second control signal and thereby disable said amplifier, means coupled to said detecting means selectively responsive to said first control signal for disabling said bucking means and thereby rendering said amplifier operative, and means responsive to the output signal from said amplifier for locking said bucking means out of operation during the persistance of said second control signal.

15. For use in a program distribution system in cooperation with a program transmitter which transmits a program signal and which, during selected periods, transmits also sequential first and second control signals of differing frequencies superimposed on said program signal, a receiver comprising: means to detect said program and control signals, means coupled to said detecting means to audibly produce said program signal, a normally inactive disabling means for said reproducing means, a vacuum tube amplifier for the second of said control signals having its input circuit coupled to said detecting means, frequency selective means in circuit with said amplifier selectively passing said second control signal, a circuit means utilizing the output signal from said amplifier to activate the disabling means for said reproducing means, said amplifier controlling circuit means normally effective upon reception of said second control signal, in absence of said first control signal, to deactivate said amplifier, and including means controlled by reception of said first control signal to enable operation of said amplifier.

16. The subject matter of claim 15, wherein said amplifier controlling circuit means includes means normally receiving the second control signal and forming a low impedance shunt for said signal across said amplifier, and includes means responsive to the first control signal for eliminating said low impedance shunt.

17. For use in a program distribution system in cooperation with a program transmitter which transmits a program signal and which, during selected periods, transmits also sequential first and second control signals of differing frequencies superimposed on said program signal, a receiver comprising: means to detect said program and control signals, normally operative reproducing means coupled to said detecting means to normally audibly reproduce the program signal, a normally inactive disabling means for said reproducing means, whereby a received program is normally continuously audibly reproduced, a normally inoperative actuating circuit for said disabling means coupled to the detecting means and including triggerable means conditioning it for operation to selectively utilize said second control signal to activate said disabling means, and triggering means for said actuating circuit coupled to said detecting means and selectively responsive to said first control signal to trigger said actuating circuit to utilize said second control signal for activation of said disabling means, whereby the reproducing means is silenced by said second control signal, said actuating circuit including means holding it in operative condition for the duration of the second control signal once operative condition has been attained, irrespective of interruption of the first control signal.

18. A program distribution system comprising a transmitter for transmitting a program signal, means in said transmitter for transmitting, during selected periods, sequential first and second control signals of two different inaudible frequencies superimposed on said program signal, said first signal comprising a momentary pulse, and said second signal having a duration for a predetermined receiver silencing interval, a receiver including means to detect said program and control signals, normally operative reproducing means coupled to said detecting means to normally audibly reproduce the program signal, a normally inactive disabling means for said reproducing means, whereby a received program is normally continuously audibly reproduced, a normally inoperative actuating circuit for said disabling means coupled to the detecting means and including triggerable means conditioning it for operation to selectively utilize said second control signal to activate said disabling means, and triggering means for said actuating circuit coupled to said detecting means and selectively responsive to said first control signal to trigger said actuating circuit to utilize said second control signal for activation of said disabling means, whereby the reproducing means is silenced by said second control signal, said actuating circuit including means holding it in operative condition for the duration of the second control signal once operative condition has been attained, notwithstanding termination of said momentary pulse first control signal.

19. For use in an electrical program distribution system in cooperation with a program transmitter which transmits electrical program material having superimposed thereon distinguishably different first and second intermittent control signals defining selected intervals, said signals having different but overlapping durations, the beginning and end of each of said intervals being defined respectively by the coincidence of said signals and the termination of said second signal, a receiver comprising: receiving means for receiving said program material and said control signals; a reproducing device coupled to said receiving means and normally operative to reproduce said program material; disabling means coupled to said reproducing device and operable upon actuation to disable said reproducing device and render the same inoperative to reproduce said program material; actuating means connected to said disabling means for actuating the same; control means coupled to said actuating means and responsive to coincidence of said signals for operating said actuating means to thereby actuate said disabling means and disable said reproducing device; and holding means coacting with said actuating means for maintaining said disabling means actuated after termination of said first signal, said holding means being responsive to termination of said second signal at the end of each of said intervals to restore said actuating means and said disabling means, whereby said reproducing device is rendered operative during the periods between successive ones of said intervals and inoperative during each of said intervals.

20. A program distribution system comprising a transmitter including means for transmitting electrical program material, and means for transmitting simultaneously with said program material distinguishably different first and second intermittent control signals defining selected intervals, said signals having different but overlapping durations, the beginning and end of each of said intervals being defined respectively by the coincidence of said signals and the termination of said second signal; and a receiver comprising receiving means for receiving said program material and said control signals, a reproducing device coupled to said receiving means and normally operative to reproduce said program material, disabling means coupled to said reproducing device and operable upon actuation to disable said reproducing device and render the same inoperative to reproduce said program material, actuating means connected to said disabling means for actuating the same, control means coupled to said actuating means and responsive to coincidence of said signals for operating said actuating means to thereby actuate said disabling means and disable said reproducing device, and holding means coacting with said actuating means for maintaining said disabling means actuated after termination of said first signal, said holding means being responsive to termination of said second signal at the end of each of said intervals to restore said actuating means and said disabling means, whereby said reproducing device is rendered operative during the periods between successive ones of said intervals and inoperative during each of said intervals.

WILLIAM M. TOMBERLIN.
LOUIS G. MACKENZIE.
PAUL K. BENNETT.

REFERENCES CITED

The following references are of record in the file of this patent:

UNITED STATES PATENTS

| Number | Name | Date |
|---|---|---|
| 1,565,521 | Stone | Dec. 15, 1925 |
| 1,988,614 | Tuczek | Jan. 22, 1935 |
| 2,312,897 | Guanella | Mar. 2, 1943 |
| 2,392,672 | Koch | Jan. 8, 1946 |
| 2,480,115 | Brown et al. | Aug. 30, 1949 |
| 2,482,039 | Thompson | Sept. 13, 1949 |
| 2,524,782 | Ferrar | Oct. 10, 1950 |
| 2,547,024 | Noble | Apr. 3, 1951 |
| 2,573,279 | Scherbatskoy | Oct. 30, 1951 |
| 2,596,138 | Feiner | May 13, 1952 |